US007933399B2

(12) United States Patent
Knott et al.

(10) Patent No.: US 7,933,399 B2
(45) Date of Patent: Apr. 26, 2011

(54) SYSTEM AND METHOD FOR UTILIZING VIRTUAL AGENTS IN AN INTERACTIVE VOICE RESPONSE APPLICATION

(75) Inventors: Benjamin Anthony Knott, Round Rock, TX (US); Philip Ted Kortum, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1323 days.

(21) Appl. No.: 11/086,796

(22) Filed: Mar. 22, 2005

(65) Prior Publication Data
US 2006/0215831 A1    Sep. 28, 2006

(51) Int. Cl.
H04M 5/00    (2006.01)
H04M 3/42    (2006.01)
(52) U.S. Cl. ............................. 379/265.02; 379/211.02
(58) Field of Classification Search ............... 379/88.01, 379/211.02, 265.01, 265.02, 88.22–88.27
See application file for complete search history.

(56) References Cited

U.S. PATENT DOCUMENTS

| 4,953,204 A | 8/1990 | Cuschleg, Jr. et al. |
| 4,967,405 A | 10/1990 | Upp et al. |
| 5,335,269 A | 8/1994 | Steinlicht |
| 5,530,744 A | 6/1996 | Charalambous et al. |
| 5,590,186 A | 12/1996 | Liao et al. |
| 5,953,704 A | 9/1999 | McIlroy et al. |
| 5,987,116 A * | 11/1999 | Petrunka et al. ......... 379/265.13 |
| 6,070,142 A * | 5/2000 | McDonough et al. ............ 705/7 |
| 6,119,101 A | 9/2000 | Peckover |
| 6,144,938 A * | 11/2000 | Surace et al. ................. 704/257 |
| 6,173,266 B1 | 1/2001 | Marx et al. |
| 6,269,153 B1 | 7/2001 | Carpenter et al. |
| 6,269,336 B1 * | 7/2001 | Ladd et al. ..................... 704/270 |
| 6,317,439 B1 | 11/2001 | Cardona et al. |
| 6,333,980 B1 | 12/2001 | Hollatz et al. |
| 6,381,329 B1 | 4/2002 | Uppaluru et al. |
| 6,385,584 B1 | 5/2002 | McAllister et al. |
| 6,389,400 B1 | 5/2002 | Bushey et al. |
| 6,400,804 B1 | 6/2002 | Bilder |
| 6,400,996 B1 | 6/2002 | Hoffberg et al. |
| 6,405,159 B2 | 6/2002 | Bushey et al. |
| 6,414,966 B1 | 7/2002 | Kulkarni et al. |
| 6,418,424 B1 | 7/2002 | Hoffberg et al. |
| 6,510,414 B1 | 1/2003 | Chaves |

(Continued)

FOREIGN PATENT DOCUMENTS

EP    0 424 015 A2    4/1991

(Continued)

OTHER PUBLICATIONS

U.S. Appl. No. 10/898,722, filed Jul. 23, 2004.

(Continued)

*Primary Examiner* — Gerald Gauthier
*Assistant Examiner* — Mohammad Islam
(74) *Attorney, Agent, or Firm* — Toler Law Group

(57) ABSTRACT

The present disclosure provides a system and method configured to establish a connection with a party at an interactive voice response (IVR) system and provide a plurality of virtual agents associated with virtual departments based on a current stage within the process. A caller or party can be prompted with a first virtual agent when addressing content related to a first virtual department and prompted by a second virtual agent when addressing content related to a second virtual department.

22 Claims, 3 Drawing Sheets

U.S. PATENT DOCUMENTS

| | | |
|---|---|---|
| 6,519,562 B1 | 2/2003 | Phillips et al. |
| 6,529,871 B1 | 3/2003 | Kanevsky et al. |
| 6,570,967 B2 | 5/2003 | Katz |
| 6,587,558 B2* | 7/2003 | Lo .......................... 379/265.09 |
| 6,598,136 B1 | 7/2003 | Norrod et al. |
| 6,614,781 B1 | 9/2003 | Elliott et al. |
| 6,631,186 B1 | 10/2003 | Adams et al. |
| 6,678,360 B1 | 1/2004 | Katz |
| 6,690,788 B1 | 2/2004 | Bauer et al. |
| 6,694,012 B1 | 2/2004 | Posthuma |
| 6,697,460 B2 | 2/2004 | Knott et al. |
| 6,700,972 B1 | 3/2004 | McHugh et al. |
| 6,707,789 B1 | 3/2004 | Arslan et al. |
| 6,714,631 B1 | 3/2004 | Martin et al. |
| 6,721,416 B1 | 4/2004 | Farrell |
| 6,751,306 B2 | 6/2004 | Himmel et al. |
| 6,757,306 B1 | 6/2004 | Klish, II et al. |
| 6,766,320 B1 | 7/2004 | Wang et al. |
| 6,775,359 B1 | 8/2004 | Ron et al. |
| 6,778,643 B1 | 8/2004 | Bushey et al. |
| 6,792,096 B2 | 9/2004 | Martin et al. |
| 6,807,274 B2 | 10/2004 | Joseph et al. |
| 6,831,932 B1 | 12/2004 | Boyle et al. |
| 6,832,224 B2 | 12/2004 | Gilmour |
| 6,842,504 B2 | 1/2005 | Mills et al. |
| 6,847,711 B2 | 1/2005 | Knott et al. |
| 6,853,722 B2 | 2/2005 | Joseph et al. |
| 6,853,966 B2 | 2/2005 | Bushey et al. |
| 6,885,734 B1 | 4/2005 | Eberle et al. |
| 6,891,932 B2 | 5/2005 | Bhargava et al. |
| 6,901,366 B1 | 5/2005 | Kuhn et al. |
| 6,907,119 B2 | 6/2005 | Case et al. |
| 7,065,201 B2* | 6/2006 | Bushey et al. ........... 379/265.01 |
| 7,127,400 B2* | 10/2006 | Koch ........................ 704/270.1 |
| 7,184,540 B2* | 2/2007 | Dezonno et al. ......... 379/265.02 |
| 7,516,190 B2* | 4/2009 | Kurganov .................... 709/217 |
| 2001/0011211 A1 | 8/2001 | Bushey et al. |
| 2001/0018672 A1 | 8/2001 | Petters et al. |
| 2001/0032229 A1 | 10/2001 | Hulls et al. |
| 2001/0034662 A1 | 10/2001 | Morris |
| 2002/0087385 A1 | 7/2002 | Vincent |
| 2002/0133394 A1 | 9/2002 | Bushey et al. |
| 2002/0133413 A1 | 9/2002 | Chang et al. |
| 2002/0156699 A1 | 10/2002 | Gray et al. |
| 2002/0196277 A1 | 12/2002 | Bushey et al. |
| 2003/0026409 A1 | 2/2003 | Bushey et al. |
| 2003/0028498 A1* | 2/2003 | Hayes-Roth .................... 706/17 |
| 2003/0143981 A1 | 7/2003 | Kortum et al. |
| 2003/0144919 A1 | 7/2003 | Trompette et al. |
| 2003/0156133 A1 | 8/2003 | Martin et al. |
| 2003/0179876 A1* | 9/2003 | Fox et al. ................ 379/265.02 |
| 2003/0187732 A1 | 10/2003 | Seta |
| 2003/0187773 A1 | 10/2003 | Santos et al. |
| 2003/0194063 A1 | 10/2003 | Martin et al. |
| 2003/0202640 A1 | 10/2003 | Knott et al. |
| 2003/0202643 A1 | 10/2003 | Joseph et al. |
| 2003/0202649 A1 | 10/2003 | Haug, Jr. et al. |
| 2003/0204435 A1 | 10/2003 | McQuilkin et al. |
| 2003/0212558 A1* | 11/2003 | Matula .......................... 704/260 |
| 2004/0005047 A1 | 1/2004 | Joseph et al. |
| 2004/0006473 A1 | 1/2004 | Mills et al. |
| 2004/0032862 A1 | 2/2004 | Schoeneberger et al. |
| 2004/0032935 A1 | 2/2004 | Mills et al. |
| 2004/0042592 A1 | 3/2004 | Knott et al. |
| 2004/0044950 A1 | 3/2004 | Mills et al. |
| 2004/0066401 A1 | 4/2004 | Bushey et al. |
| 2004/0066416 A1 | 4/2004 | Knott et al. |
| 2004/0073569 A1 | 4/2004 | Knott et al. |
| 2004/0088285 A1 | 5/2004 | Martin et al. |
| 2004/0101127 A1* | 5/2004 | Dezonno et al. ......... 379/265.02 |
| 2004/0103017 A1 | 5/2004 | Reed et al. |
| 2004/0109555 A1 | 6/2004 | Williams |
| 2004/0125937 A1 | 7/2004 | Turcan et al. |
| 2004/0125938 A1 | 7/2004 | Turcan et al. |
| 2004/0125940 A1 | 7/2004 | Turcan et al. |
| 2004/0161078 A1 | 8/2004 | Knott et al. |
| 2004/0161094 A1 | 8/2004 | Martin et al. |
| 2004/0161096 A1 | 8/2004 | Knott et al. |
| 2004/0174980 A1 | 9/2004 | Knott et al. |
| 2004/0230438 A1 | 11/2004 | Pasquale et al. |
| 2004/0240635 A1 | 12/2004 | Bushey et al. |
| 2004/0243568 A1 | 12/2004 | Wang et al. |
| 2005/0008141 A1 | 1/2005 | Kortum et al. |
| 2005/0015744 A1 | 1/2005 | Bushey et al. |
| 2005/0027535 A1 | 2/2005 | Martin et al. |
| 2005/0041796 A1 | 2/2005 | Joseph et al. |
| 2005/0047578 A1 | 3/2005 | Knott et al. |
| 2005/0055216 A1 | 3/2005 | Bushey et al. |
| 2005/0058264 A1 | 3/2005 | Joseph et al. |
| 2005/0075894 A1 | 4/2005 | Bushey et al. |
| 2005/0078805 A1 | 4/2005 | Mills et al. |
| 2005/0080630 A1 | 4/2005 | Mills et al. |
| 2005/0080667 A1 | 4/2005 | Knott et al. |
| 2005/0131892 A1 | 6/2005 | Knott et al. |
| 2005/0132262 A1 | 6/2005 | Bushey et al. |
| 2005/0135595 A1 | 6/2005 | Bushey et al. |
| 2005/0169453 A1 | 8/2005 | Knott et al. |
| 2006/0190424 A1* | 8/2006 | Beale et al. ....................... 707/2 |
| 2008/0152094 A1* | 6/2008 | Perlmutter ................. 379/88.01 |

FOREIGN PATENT DOCUMENTS

| | | |
|---|---|---|
| EP | 0 424 015 A3 | 4/1991 |
| EP | 0 424 015 B1 | 4/1991 |
| EP | 0 876 652 A4 | 9/1996 |
| WO | WO 97/26612 | 7/1997 |
| WO | WO 01/37539 A2 | 5/2001 |
| WO | WO 01/37539 A3 | 5/2001 |
| WO | WO 2004/017584 | 2/2004 |
| WO | WO 2004/049222 A2 | 6/2004 |

OTHER PUBLICATIONS

U.S. Appl. No. 10/901,926, filed Jul. 28, 2004.
U.S. Appl. No. 10/901,925, filed Jul. 28, 2004.
U.S. Appl. No. 10/917,233, filed Aug. 12, 2004.
U.S. Appl. No. 10/935,726, filed Sep. 7, 2004.
U.S. Appl. No. 10/999,199, filed Nov. 29, 2004.
U.S. Appl. No. 11/005,498, filed Dec. 6, 2004.
U.S. Appl. No. 11/005,494, filed Dec. 6, 2004.
U.S. Appl. No. 11/010,633, filed Dec. 13, 2004.
U.S. Appl. No. 11/032,495, filed Jan. 10, 2005.
U.S. Appl. No. 11/036,204, filed Jan. 14, 2005.
U.S. Appl. No. 11/036,201, filed Jan. 14, 2005.
U.S. Appl. No. 11/062,100, filed Feb. 18, 2005.
U.S. Appl. No. 11/071,068, filed Mar. 3, 2005.
U.S. Appl. No. 10/975,023, filed Oct. 27, 2004.
U.S. Appl. No. 11/129,051, filed May 13, 2005.
U.S. Appl. No. 11/145,513, filed Jun. 3, 2005.
U.S. Appl. No. 11/173,227, filed Jul. 1, 2005.
U.S. Appl. No. 11/176,972, filed Jul. 7, 2005.
U.S. Appl. No. 11/086,794, filed Mar. 22, 2005.
U.S. Appl. No. 10/996,127, filed Nov. 23, 2004.
U.S. Appl. No. 10/920,719, filed Dec. 13, 2004.
U.S. Appl. No. 10/920,720, filed Aug. 18, 2004.
U.S. Appl. No. 10/948,089, filed Sep. 23, 2004.
U.S. Appl. No. 10/979,784, filed Nov. 2, 2004.
U.S. Appl. No. 11/212,939, filed Aug. 25, 2005.

* cited by examiner

SYSTEM AND METHOD FOR UTILIZING VIRTUAL AGENTS IN AN INTERACTIVE VOICE RESPONSE APPLICATION

FIELD OF THE DISCLOSURE

The present disclosure relates generally to an interactive voice response system and more particularly to the use of virtual departments and virtual agents in such a system.

BACKGROUND

Millions of telephone calls are made to call centers and to individuals conducting businesses during every business hour. In an effort to service these calls most modern call centers have specialized departments and utilize an automated call-processing system to process incoming calls. In such systems an incoming call is typically answered by an automated voice and then the call is routed to the appropriate department responsive to caller input. Automated call receiving systems that can accept caller input are often referred to as interactive voice response (IVR) systems. A more sophisticated IVR system that can process or recognize speech input is often referred to as a speech recognition IVR. Parties typically call a call center to make an inquiry or request a service. A universal concern that callers have during interactions with IVR systems is where they are in process or system, where they are going to be routed and where they have been. Accordingly, there is a need for a call handling system that provides improved situational awareness for the party of a call.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE DRAWINGS

Figure 1:
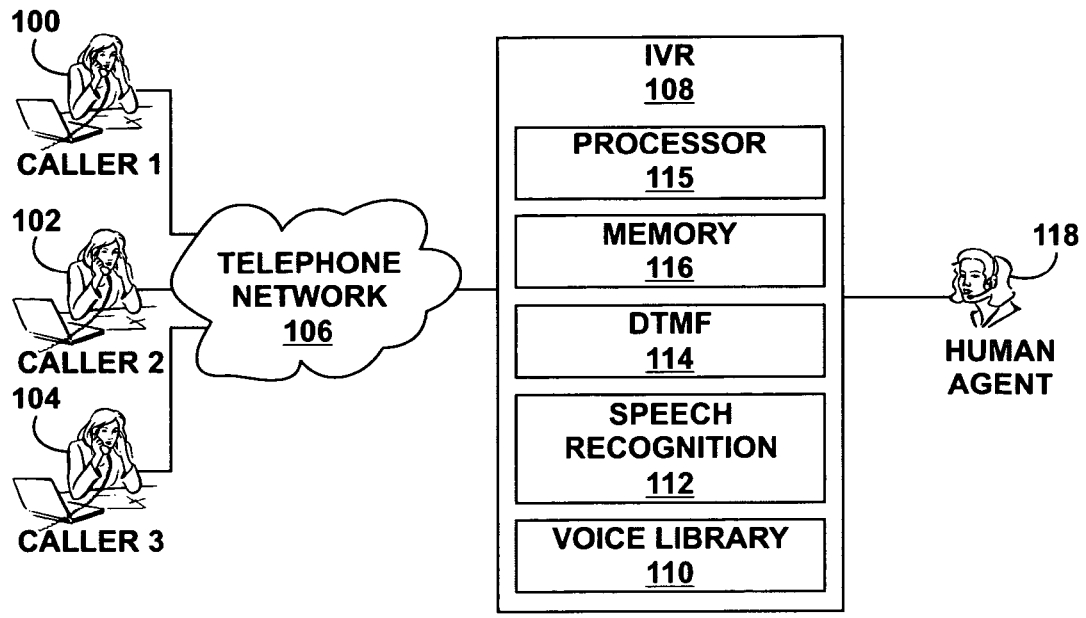
FIG. 1 presents an illustrative block diagram of a call processing system.

Larger businesses typically organize their call centers into departments wherein each department has the tools, knowledge and expertise to solve problems associated with a particular subject matter. Many call centers utilize an automated main operator to greet callers and prompt callers for the purpose of the call. However, automating an entire call servicing system with a main operator can seem void of personality, expertise, flow and purpose, quite possibly creating an unpleasant experience for a caller. Further, purely informational call centers such as those providing a restaurant locator service or a movie listing service can seem impersonal and awkward with a single automated operator. In accordance with the teachings herein, a call center with virtual agents attending to the duties of virtual departments is described. The virtual agents may purport to have subject matter expertise, such that expert service can be provided to the party.

The present disclosure teaches a system and method that provides an interactive voice response system (IVR) that segments caller-IVR interactions into virtual departments by utilizing virtual agent to address subject matter assigned to the virtual department. In operation a connection between a party and an interactive voice response (IVR) system is made and multiple virtual agents are utilized to allow a party to associate a virtual agent with a virtual department, thus providing indicia of a location within the call processing procedure. A caller or party can be prompted with a first virtual agent when addressing content related to a first virtual department and then prompted by a second virtual agent when addressing content related to a second virtual department.

The term "caller" and "party" are used interchangeably herein to refer to either a party making a call or a party receiving a call. Depending upon implementation detail, the teachings disclosed herein may be implemented in an outbound call center, an inbound call center, and/or a hybrid call center capable of both placing and receiving calls.

Depending upon implementation detail, a party can be prompted by a first virtual agent, possibly a main operator and in response to a party's reply, the first virtual agent or voice persona can advise the party that the call is being routed to a specialized virtual agent, representing a virtual department who is learned in addressing the party's issue(s). The second virtual department, virtual agent or voice persona can again prompt the party to learn more about the party's issue's to be addressed. The second virtual agent can also have a discrete persona and purport to be from a specialized department and have subject matter expertise for addressing the party's request. Thus, the IVR can provide a party with personal, specialized services utilizing multiple virtual agents. This preferential treatment allows a party to experience the feeling of being routed between specialized departments as they interface with the different virtual agents specialized in providing specialized information or solving subject matter based problems.

Referring to FIG. 1 an illustrative example of a system for processing calls utilizing discrete personalities or personas. In one configuration the system includes a first caller 100, a second caller 102, and a third caller 104 coupled to a telephone network 106 which in turn is coupled to an interactive voice response (IVR) system 108. The IVR system 108 can be comprised of a processor 115 coupled to a memory 116, a dual-tone multi-frequency (DTMF) detector 114, a speech recognition module 112 and a voice library 110. The DTMF detector 114 can accept touch-tone inputs from a caller and provide control signals according to the callers touch tone inputs while the speech recognition module 112 can accept utterances from the caller and provide control signals. The IVR system 108 can be coupled to a human agent 118 such that when the IVR system 108 cannot appropriately process a call, the caller can be routed to human agent 118. Although only one human agent 118 is shown, hundreds of agent may be utilized in accordance with the teachings herein.

In one operational embodiment the IVR system 108 can receive a call from a caller, or place a call to a caller and processor 115 retrieves a first voice persona, such as a main operator persona from voice library 110 and utilizes the first voice persona to greet the caller and prompt the caller for the intent of the call. The speech recognition module 112 or the DTMF detector 114 can receive the caller's response and the processor 115 can select a second voice persona based on the caller's response.

In one embodiment the caller's response, such as a request for information, a request to address an issue or a request to solve a problem could be a classified according to a specific subject matter. When the IVR 108 determines that new or different subject matter is at issue, the processor 115 would facilitate usage of a voice persona assigned to such subject matter. The IVR system 108 may have discrete, distinguished and exclusive digital voice personas associated with each issue or identified subject matter. Examples of subject matter can include billing, account services, dispute resolution, maintenance, subscriptions, technical support, engineering support, and discrete information delivery. The list above is merely illustrative as thousands of subject matter classification could be utilized in accordance with the teachings herein.

Depending upon implementation detail, the interactive voice response system 108 can contain a voice library 110 that stores many different voice personas in digital format. The voice personas can include a main operator and a plurality of voice personalities with purported subject matter expertise that can be utilized to address caller concerns. The different voice personas or distinguishable voices in the voice library 110 can be stored by, or linked to, subject matter and the voice personas may include audio that provides cues to the caller that the voice is associated with discrete subject matter. As such, a person calling system 108 may be left with the impression that system 108 is a physical location were people—who are subject matter experts—work to help customers resolve concerns and/or answer questions. System 108 may be a call center in a box and may rely on processor 115 utilizing instructions retrieved from memory 116 to select digital voices stored in the voice library 110 based on the subject matter of the caller-IVR interaction.

The distinguished voice-subject matter correlation can provide a conscious knowledge-of-location within the system to the caller when the distinguished voice verbally identifies its' subject matter expertise and when hand-off cues are provided by virtual agents during a change of agents. The distinguishable voice-subject matter correlation can also provide an unconscious knowledge-of-location by the mannerisms, linguistics and verbal explanations in the voice. For example, callers to a restaurant locater call center may "tell" a female hostess agent that they want to know about French restaurants in the area and in response, the caller may be routed to a new male virtual agent expert, who would greet the caller with a French accent, "Bonjour! Let me help you find a romantic French restaurant, what is the price range you would like to explore" (accent omitted).

In one embodiment, the discrete voices can have different personas, accents or virtual personalities that are conducive to provide information or process the caller's request in a pleasurable and memorable manner. As described above, the voices provided subsequent to the greeting voice, could have personna's that are associated with, and exclusive within system 108 to, the subject matter being addressed by the call. Further, the subsequent voices can provide indicia of having expertise by informing the party.

The discrete voices provided can have many personas such as a celebrity voice persona and a dialect persona. For example, when a caller is routed to a paint department in a department store, a Martha Stewart emulation could address the caller or when a caller is seeking help to purchase a computer, a Bill Gates impersonation could address the caller. The subject matter expertise of the voice personas can include a receptionist/main operator, a billing, accounting, dispute resolution department, new subscriptions, maintenance, customer service, and an engineering department.

Figure 2:
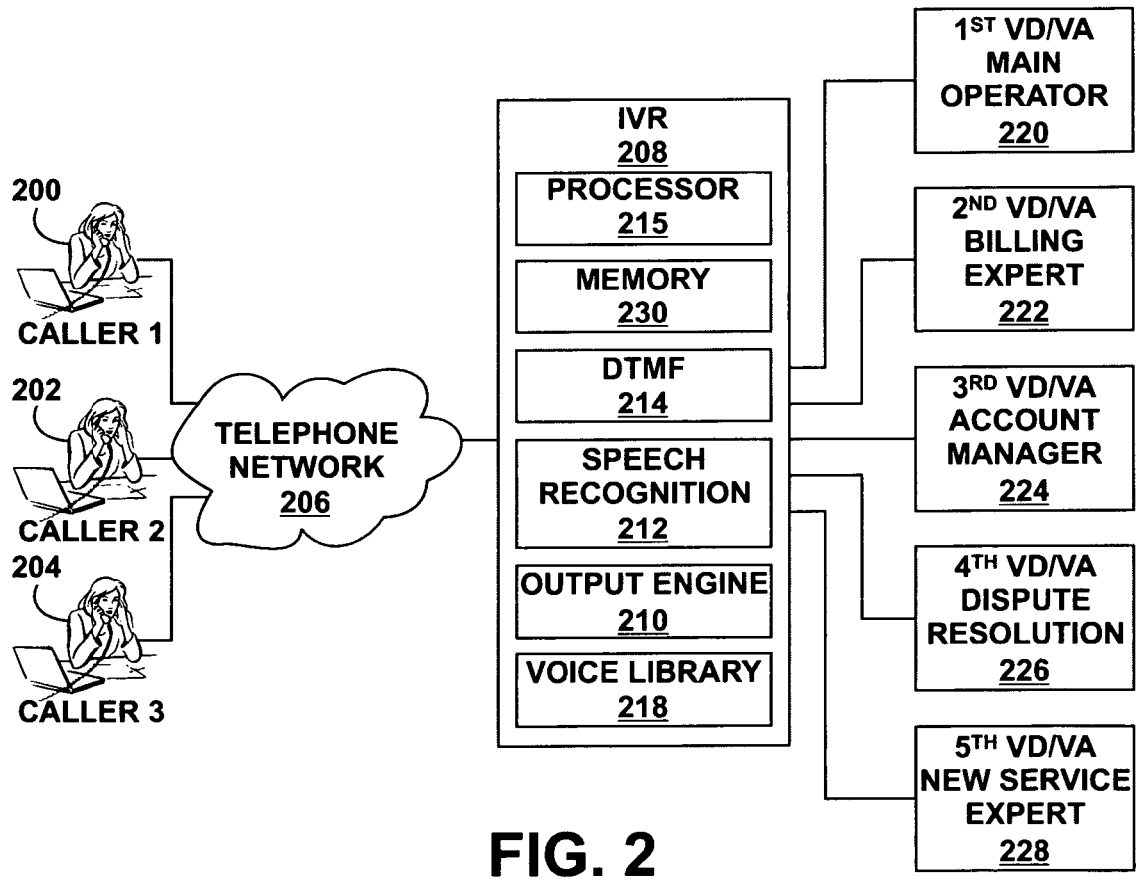
FIG. 2 presents an illustrative block diagram of an alternate call processing system.

Referring now to FIG. 2 an alternate description of a system for processing calls having virtual agents representing virtual departments is provided. First caller 200, second caller 202 and third caller 204 can be coupled to an interactive voice response system 208 via a telephone network 206. The IVR system 208 can include a processor 215, a memory 230, a dual-tone multi-frequency (DTMF) detector 214, a voice library 218, a speech recognition module 212 and an output engine 210.

The interactive voice response system 208 can be coupled to a plurality of virtual agent/virtual departments such as first, second third fourth and fifth virtual agents, 220, 222, 224, 226, and 228 respectively. Depending on implementation detail, first virtual agent 220 may be utilized exclusively for addressing subject matter or issues such as greeting and prompting a caller while second virtual agent 222 may exclusively address issues regarding billing. Further, third virtual agent 224 may only address issues regarding account management and fourth virtual agent 226 may only address issues regarding dispute resolution, while fifth virtual agent 228 may only address issues such as adding a new service.

In an illustrative embodiment, the first virtual agent 222 could be the main operator that would initially interface a caller. For example, the first virtual agent 222 may address the caller by saying, "Hello, I am Amy the receptionist for XX company. I will be assisting you in locating an expert within our company who can provide you with information and address your concerns, please tell me how we can help you." In reply, the caller may say, "I have a question about my bill" and the speech recognition module 212 could process the caller utterance. The speech recognition module 212 could associate the caller's input with IVR departments or stages such as the billing department, (a virtual department) and route the call to the second virtual agent 222 who can provide a virtual expertise associated with the virtual billing department. Thus, the first virtual agent 220 may provide, "Thanks for your reply, I am going to transfer you to Bill the billing specialist."

Depending upon implementation detail, the processor 230 utilizing instructions retrieved from memory 216 could retrieve a voice personality from voice library that is associated with the selected virtual department. Thus, after the call is routed to the second virtual agent 222 a virtual agent voice pattern can be retrieved from the voice library 218 and the output engine 210 can provide to the caller, "Hi, I am Bill the billing agent, and I am from the billing department and I am here to help you with your billing inquiry, what would you like to know about your bill?

When a caller responds with additional questions or issues the interactive voice response system 208 could route the call to any of the virtual departments/virtual agents specializing in addressing the issue such as the, virtual account manager agent 224, the virtual dispute resolution agent 226 and the virtual new service agent 228. In the subject illustration only five virtual agents are depicted, however hundreds and even thousands of virtual agents/department could be utilized. In alternate embodiments the caller can reply to virtual agent prompts by making touch-tone inputs and the DTMF 214 module could process caller input.

The virtual agents 220-228 can have different personalities such as a male or female personalities, different enthusiasms, demeanors, accents, and tones. Further, the virtual agents can have celebrity characteristics, speak a specific dialect, provide a regional accent, provide foreign language characteristics, provide colloquial phrases, and have a groomed voice characteristic. A groomed voice characteristic may be a distinct voice that after a few calls or interactions, a caller will recognize. The virtual agent can have a name and provide the name and a description of the virtual agents expertise to the caller during interaction with the caller.

Figure 3:
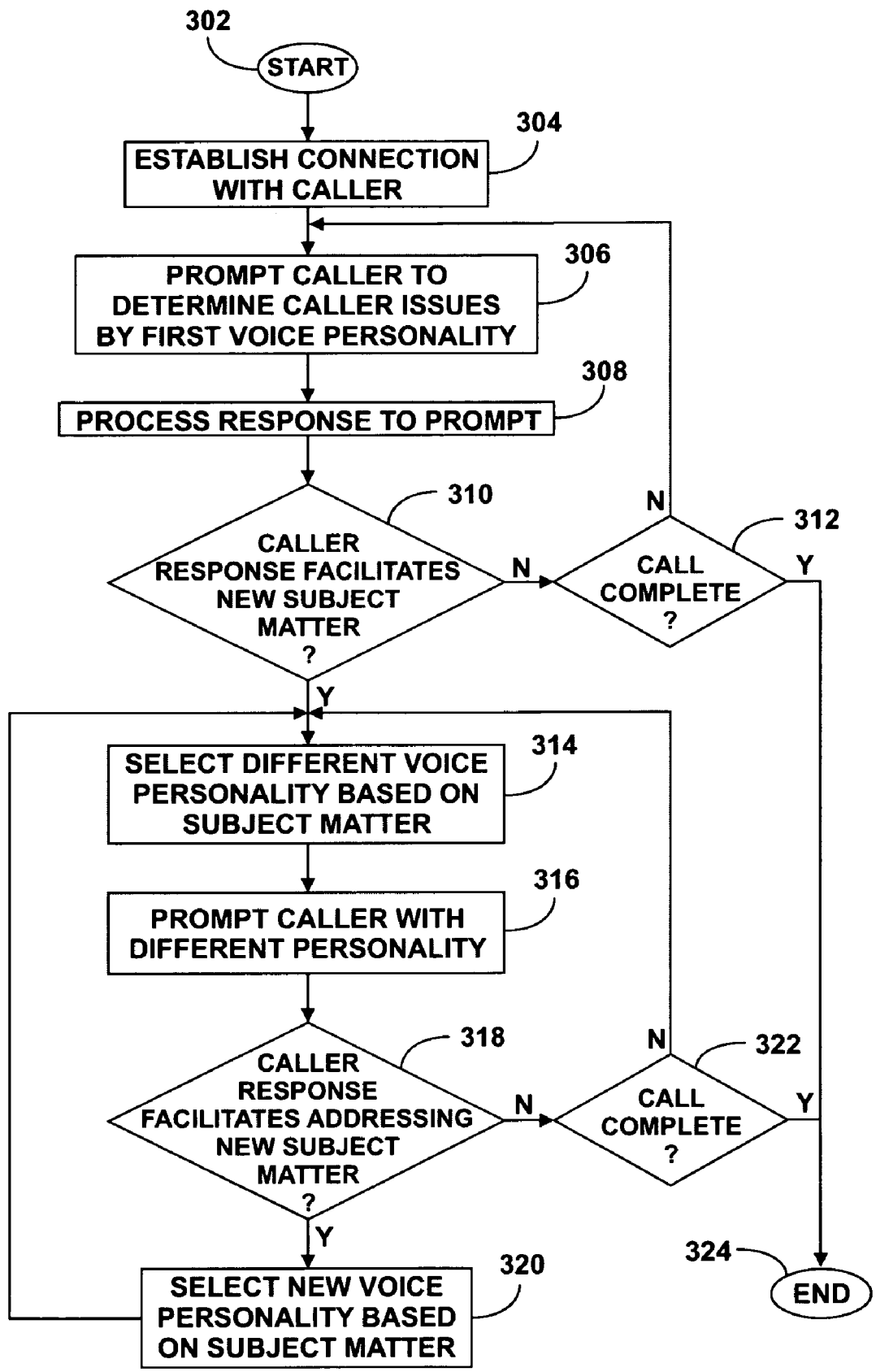
FIG. 3 presents a flow diagram that illustrates a method of processing calls.

Referring now to FIG. 3 a method that can be executed by the system described in FIGS. 1 and 2 is provided. The method starts at step 302 and proceeds to step 304 where a connection is established between an IVR and a party. In operation, the party can be prompted to determine the purpose or subject matter of the call, or the issue that will likely be addressed during the call at step 306. For example, the first personality may be a main operator that can prompt a party to determine the party's intent and correspondingly the party's response can be processed at step 308.

At decision step 310 it can be determined if the party's response facilitates new or different subject matter. When the party's response does not facilitate new subject matter, it can be determined if the call is complete at decision step 312. If the call is not complete, the method proceeds back to step 306 where the party is again prompted however, if the call is complete the method proceeds to end at step 324.

At decision step 310 when the party provides a response such as a request that prompts a change in subject matter to be addressed by the IVR, a new or different voice personality can be selected to interact with the party at step 314. In one embodiment, the new voice personality is selected based on the newly identified subject matter. The new voice personality can introduce itself as an expert on the subject matter of the interaction and prompt the party with a distinguishable voice personality at step 316. Based on a party's response to the prompt it can be determined at decision step 318 if the response facilitates new or additional subject matter.

When the party's response facilitates new subject matter to be processed by the IVR at decision step 318 a new voice personality is again selected possibly based on the new subject matter at step 320 and the process returns to step 314. When the party's response does not facilitate addressing new or additional subject matter, it can be determined if the call is completed at step 322. When the call is completed, the process ends at 324 and if the call is not completed the method can proceed back to step 316.

In one embodiment a voice personality can also be chosen based on a perceived characteristic of the party or on a perceived characteristic of the party and newly identified subject matter. The perceived characteristic can determined by processing an utterance of the party. For example, a detected regional accent, a non-English language, slang dialect, a demeanor, a personality, an age, and an intelligence level could aid in selecting a voice persona that the caller would appreciate. The IVR system and method disclosed herein is configured to simulate the routing of a call to different specialized departments, wherein each specialized department has purported expertise to address specific concerns provided by the caller.

Figure 4:
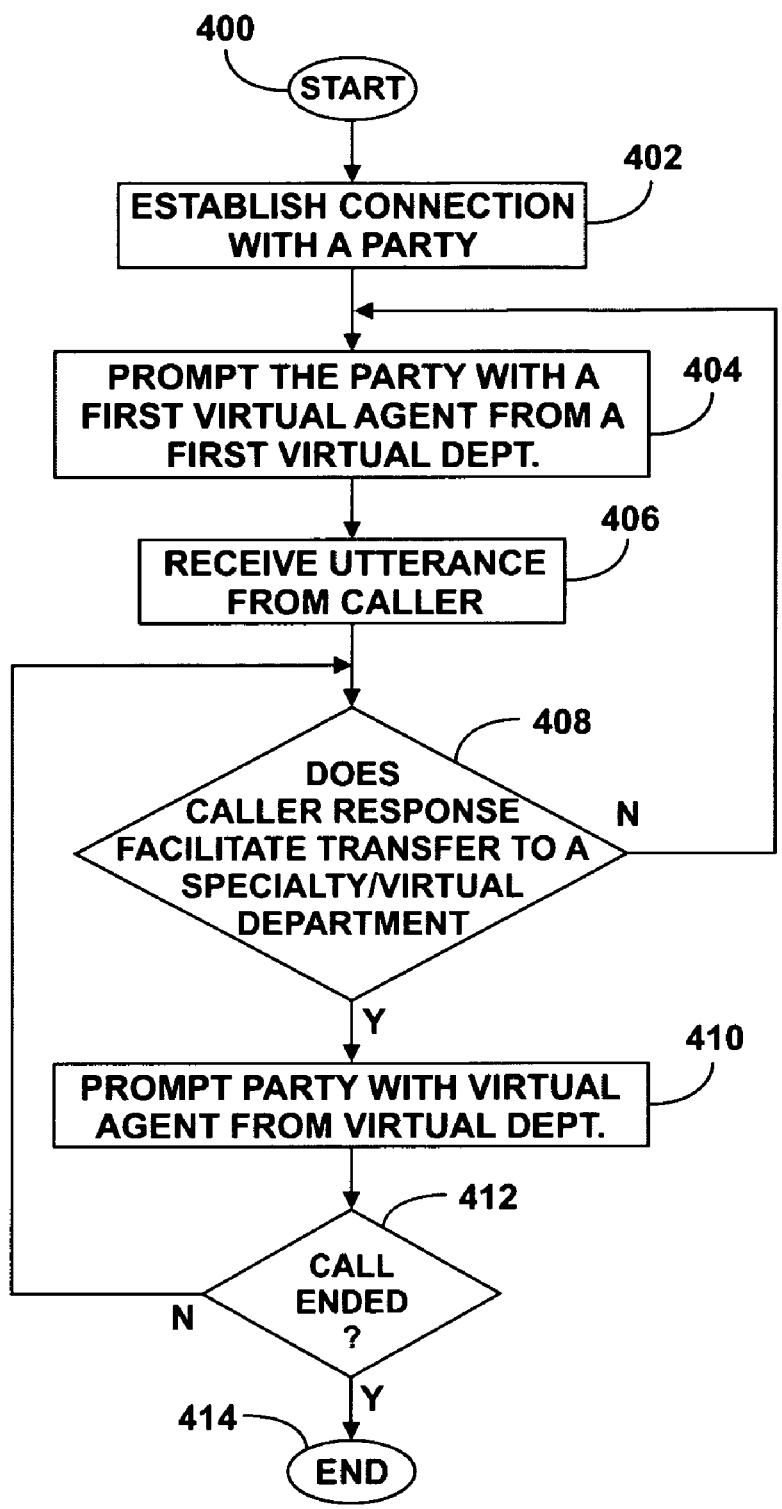
FIG. 4 presents a flow diagram that illustrates an alternate method of processing calls.

Referring now to FIG. 4 an alternate method for providing an IVR, or a caller response system with virtual agents is provided. The method starts at step 400 and proceeds to step 402 where a connection is established with a party. In the illustrated example the party is prompted with a first virtual agent from a first virtual department at step 404. Utterance is received from the party at 406 and it is determined if the party's response facilitates transferring to a specialty or virtual department at decision block 408. If the parties response does not facilitate transferring to a different virtual agent the process proceeds back to block 404. However, if the caller response facilitates transferring to another virtual department, the process proceeds to prompt the party with a virtual agent from a virtual department having a virtual expertise or a distinguished characteristic at step 410. When it is determined that the call objectives have not been completed at decision step 412, the process returns to decision step 408. However, when it is determined that the call objectives are complete the process ends at step 414.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of processing calls comprising:
    establishing at least a portion of a connection between a party and an interactive voice response (IVR) system, wherein the IVR system interacts with the party using a plurality of virtual agents, wherein each virtual agent represents a virtual department;
    selecting a first distinguishable voice for a first virtual agent from a voice library;
    prompting the party with the first virtual agent when addressing content related to a first virtual department, wherein the first virtual agent uses the first distinguishable voice;
    receiving a response from the party;
    selecting a second virtual department based on the response;
    selecting a second distinguishable voice for a second virtual agent associated with the second virtual department from the voice library, wherein the second distinguishable voice is different than the first distinguishable voice; and
    prompting the party with the second virtual agent, wherein the second virtual agent identifies itself with a name and notifies the party that the second virtual agent handles issues addressed by the second virtual department, and wherein the second virtual agent uses the second distinguishable voice.

2. The method of claim 1, wherein the first distinguishable voice has characteristics of a female voice and wherein the second distinguishable voice has characteristics of a male voice.

3. The method of claim 1, wherein the second virtual agent provides a specialized service comprising at least one of a billing service, an account service, a dispute resolution service, a maintenance service, a new subscription service and an engineering service.

4. The method of claim 1, wherein the first virtual agent identifies itself as a receptionist.

5. The method of claim 1, wherein the second virtual agent identifies itself to the party as being associated with particular subject matter expertise.

6. The method of claim 2, wherein the second virtual agent is selected based on an issue within the party utterance.

7. An interactive voice system comprising:
    a processor to initiate a provisioning of audio to a party of a given call;
    a memory to store instructions useable by the processor to indicate a stage of the given call,
    a voice library operable to store a plurality of distinguishable voices, wherein at least one of the plurality of distinguishable voices represents a virtual department; and
    an output engine that uses a first distinguishable voice from the voice library to prompt the party at a first stage of the given call and that uses a second distinguishable voice from the voice library at a second stage of the given call based on a virtual department associated with the second stage of the given call, wherein the output engine uses the second distinguishable voice to inform the party of a name associated with the second distinguishable voice and a description of an area of expertise associated with the second distinguishable voice, the output engine configured to provide the first distinguishable voice and the second distinguishable voice based on the subject matter of the first stage and the second stage, wherein the first distinguishable voice is different than the second distinguishable voice.

8. The system of claim 7, wherein the output engine utilizes the first distinguishable voice to notify the party that the party is interfacing with the first stage and that the party will be interfacing with an identifier associated with the second distinguishable voice during the second stage.

9. The method of claim 7, wherein the first distinguishable voice is distinguishable from the second distinguishable voice based on at least one of a male personality, a female personality, an accent characteristic, a colloquial phrase characteristic, and a tone.

10. The method of claim 7, wherein the voice library maintains a first version and a second version of the second distinguishable voice, wherein the output engine is further configured to select one of the first version and the second version of the second distinguishable voice from the voice library based at least partially on a perceived characteristic of the party.

11. The method of claim 10, wherein the perceived characteristic of the party is at least partially ascertained through processing an utterance of the party.

12. The method of claim 10, wherein the perceived characteristic is one of a regional accent, a slang dialect, a demeanor, a personality, an age, and an intelligence level.

13. An interactive voice response method comprising:
establishing a connection with a party,
prompting the party with a first distinguishable voice from a voice library in a first stage of an interactive voice response (IVR) menu, the first stage having first subject matter;
receiving a response to the prompting;
advancing to a second stage of the IVR menu having second subject matter based on the response;
selecting a second distinguishable voice different than the first distinguishable voice from the voice library to interface with the party when addressing the second subject matter; and
prompting the party for information with the second distinguishable voice based on the response, wherein the prompt includes informing the party of a name associated with the second distinguishable voice and a description of an area of expertise associated with the second distinguishable voice.

14. The method of claim 13, wherein the second distinguishable voice is selected from the voice library based on one or more characteristics of the response to the prompting.

15. The method of claim 13, wherein the first subject matter is related to at least one of: an inquiry into a purpose of a call, a bill, a payment, a repair service, a mailing address, a new service subscription, cancellation of a service, managing an account, balance information, and resolving a dispute.

16. The method of claim 13, further comprising advancing the IVR menu to a third stage based on another response and selecting a third distinguishable voice from the voice library based on third subject matter, wherein the third distinguishable voice is associated with another virtual department that is associated with the third subject matter, and wherein the third distinguishable voice is different than the first distinguishable voice and the second distinguishable voice.

17. A non-transitory computer readable medium comprising instructions executable by a processor to:
engage in a call with a party to the call;
prompt the party with a first distinguishable voice from a voice library in a first stage of an interactive voice response (IVR) menu;
receive an utterance from the party;
advance to a second stage of the IVR menu;
select a second distinguishable voice from the voice library to use in the second stage of the IVR menu, wherein the second distinguishable voice is different than the first distinguishable voice, and wherein the second distinguishable voice is based on subject matter associated with the second stage of the IVR menu; and
send the party a second prompt to provide another utterance with the second distinguishable voice, wherein the second prompt includes a name associated with the second distinguishable voice and an area of expertise associated with the second distinguishable voice.

18. The non-transitory computer readable medium of claim 17, further including instructions executable by the processor to advance to the second stage of the IVR menu responsive to the utterance.

19. The non-transitory computer readable medium of claim 17, wherein the subject matter associated with the second stage of the IVR menu includes one of a billing service, an account service, a dispute resolution service, a maintenance service, a new subscription service, a customer service, an engineering service, and an informational service.

20. The non-transitory computer readable medium of claim 17, wherein the second distinguishable voice introduces itself to the party by identifying an area of subject matter expertise associated with the second voice personality.

21. The non-transitory computer readable medium of claim 17, wherein the second distinguishable voice provides audio cues to the party that indicate that the second distinguishable voice is associated with the subject matter of the second stage of the IVR menu.

22. The non-transitory computer readable medium of claim 17, wherein the second distinguishable voice is selected from the voice library based on a perceived characteristic of the party determined by processing the utterance.

* * * * *